US009700032B2

(12) United States Patent
Takechi

(10) Patent No.: US 9,700,032 B2
(45) Date of Patent: Jul. 11, 2017

(54) CLUTCH RETURN MECHANISM FOR A DUAL-BEARING REEL

(71) Applicant: Shimano Inc., Sakai, Osaka (JP)

(72) Inventor: Kunio Takechi, Osaka (JP)

(73) Assignee: Shimano Inc., Osaka (JP)

( * ) Notice: Subject to any disclaimer, the term of this patent is extended or adjusted under 35 U.S.C. 154(b) by 252 days.

(21) Appl. No.: 14/658,710

(22) Filed: Mar. 16, 2015

(65) Prior Publication Data

US 2015/0342167 A1    Dec. 3, 2015

(30) Foreign Application Priority Data

Jun. 3, 2014    (JP) ................. 2014-114752

(51) Int. Cl.
*A01K 89/01* (2006.01)
*A01K 89/015* (2006.01)

(52) U.S. Cl.
CPC .... *A01K 89/01901* (2015.05); *A01K 89/0189* (2015.05)

(58) Field of Classification Search
CPC .............. A01K 89/015; A01K 89/0186; A01K 89/0187; A01K 89/0189; A01K 89/01901
See application file for complete search history.

(56) References Cited

U.S. PATENT DOCUMENTS

| 4,369,936 | A | * | 1/1983 | Noda ................... | A01K 89/015 |
|---|---|---|---|---|---|
| | | | | | 192/69.7 |
| 4,406,427 | A | * | 9/1983 | Murakami ........... | A01K 89/015 |
| | | | | | 242/261 |
| 2007/0181728 | A1 | * | 8/2007 | Kawasaki .............. | A01K 89/00 |
| | | | | | 242/310 |
| 2010/0327098 | A1 | * | 12/2010 | Hyun ................... | A01K 89/015 |
| | | | | | 242/301 |

FOREIGN PATENT DOCUMENTS

JP       2012-65574 A      4/2012

* cited by examiner

*Primary Examiner* — Emmanuel M Marcelo
(74) *Attorney, Agent, or Firm* — Global IP Counselors, LLP

(57) ABSTRACT

A clutch pawl includes a synthetic resin body member and a metallic reinforcing member. The synthetic resin body member is pivotally mounted to a clutch cam. The metallic reinforcing member integrally pivots with the body member and reinforces the body member. The toggle spring member divides and biases the clutch pawl to the engaged position and the separated position.

10 Claims, 7 Drawing Sheets

CLUTCH RETURN MECHANISM FOR A DUAL-BEARING REEL

CROSS-REFERENCE TO RELATED APPLICATIONS

This application claims priority to Patent Application JP 2014-114752 filed on Jun. 3, 2014, the contents of which is hereby incorporated herein by reference.

BACKGROUND

Field of the Invention

The present invention relates to a clutch return mechanism and, specifically, to a clutch return mechanism for a dual-bearing reel for returning a clutch cam from a released position, in which a handle and a spool of a dual-bearing reel are in a released state, to a coupled position, in which the handle and the spool are coupled.

Background Information

A clutch mechanism is generally disposed between a handle and a spool of a dual-bearing reel (for example, refer to Japanese Laid-Open Patent Publication No. 2012-65574). The clutch mechanism is in a clutch-on state for coupling the handle and the spool and a clutch-off state for releasing the handle and the spool. In the clutch-on state, the spool is capable of being rotated by the rotation of the handle. In the clutch-on state, the spool is freely rotatable.

The clutch mechanism is switched between the clutch-on state and the clutch-off state by a clutch control mechanism comprising a clutch operating member. A conventional clutch mechanism comprises a clutch operating member, a tubular clutch cam made of synthetic resin, a clutch yoke, a metallic coupling member, and a clutch return mechanism.

The clutch return mechanism comprises a rotating member that is integrally and rotatably provided to the handle shaft, the clutch return member, and a biasing member. One end of the clutch return member is pivotally coupled to the clutch cam. Specifically, a coupling pin is integrally formed at one end of the clutch return member, and the coupling pin engages a coupling hole on the clutch cam. The clutch return member moves back and forth between an engaged position that engages a rotating member and a separated position that is separate from the rotating member. When the clutch cam is turned to the coupled position by the operation of the clutch operating member, the other end of the clutch return member advances to the engaged position. The biasing member divides and biases the clutch return member to the engaged position and the separated position.

Accordingly, in the clutch return mechanism, when the handle rotates in the casting direction, the rotating member presses the other end of the clutch return mechanism, which is in the engaged position, beyond the dead center of the biasing member. Consequently, the clutch return member returns to the separated position due to the biasing force of a toggle spring member. When the clutch return member moves to the separated position, the clutch cam turns from a released position, corresponding to the clutch-off state, to a coupled position, corresponding to the clutch-on state, and the clutch mechanism returns to the clutch-on state.

SUMMARY

In a conventional clutch return mechanism, the clutch return member is, for example, a metallic member, such as a sintered stainless steel alloy. Additionally, the clutch cam is generally made of synthetic resin, etc. to facilitate the formation with respect to shaping the clutch cam. In a conventional clutch return mechanism, for example, a metallic member is used as the clutch return member. Conventionally, since the rotational force of a clutch return member made of a hard material that is not easily plastically deformed is directly transmitted to the synthetic resin clutch cam, when excessive rotational force is applied, there is the risk that the clutch cam will be deformed. Additionally, since the clutch return member is made of metal, reducing the weight of the clutch return member can be difficult.

In order to solve this problem, forming a clutch return member from a relatively soft material, such as resin, is conceivable; however, the strength that is necessary for a clutch return member cannot be obtained in this manner.

The object of the present invention is to reduce the weight while maintaining the strength of the clutch return member, and while preventing deformation of the clutch cam in a clutch return mechanism of a dual-bearing reel.

The clutch return mechanism of a dual-bearing reel according to the present invention is a mechanism for returning a clutch cam from the released position to the coupled position. The clutch cam is rotatably mounted to a reel body, and the clutch cam is positionable between a coupled position, in which a handle coupled to the reel body and a spool that rotates with the handle are in a coupled state, and a released position, in which the handle and the spool are in a released state. The clutch return mechanism comprises a rotating member that is integrally rotatable with the handle, a clutch return member, and a biasing member. The clutch return member comprises a first end and a second end that extends from the first end toward the rotating member; the first end is pivotally coupled to the clutch cam by a pivot shaft that is disposed to be parallel to a rotating shaft of the spool between an engaged position, in which the second end engages with the rotating member, and a separated position, in which the second end is separated from the rotating member. The clutch return member comprises a synthetic resin body member and a metallic reinforcing member. The synthetic resin body member is pivotally mounted to the clutch cam. The metallic reinforcing member is integrally pivotal with the body member and reinforces the body member. The biasing member divides and biases the clutch return member to the engaged position and the separated position.

In this clutch return mechanism, the clutch return member, which returns the clutch cam from a released position to a coupled position, is formed from a synthetic resin body member and a reinforcing member, which reinforces the body member. In this embodiment, it is possible to secure the necessary strength with the metallic reinforcing member, and secure the flexibility and reduce the weight in order to prevent the deformation of the clutch cam with the synthetic resin body member. As a result, it is possible to reduce the weight while maintaining the strength of the crank member and prevent the deformation of the clutch cam.

The reinforcing member may comprise an engagement surface that is disposed on at least a portion of the second end and engages with the rotating member at the engaged position. In this embodiment, since the engagement surface of the metallic reinforcing member engages the rotating member at the engaged position, the engagement surface is less likely to be deformed or worn, and the force of the rotating member will be reliably transmitted to the clutch return member without escaping.

The body member may comprise a first surface that is disposed so as to intersect the pivot shaft, and the reinforcing member may comprise a first reinforcing surface that reinforces at least a portion of the first surface. In this embodiment, reinforcing the first surface between the first end and the second end is possible with the first reinforcing surface.

The body member may comprise a second surface that is disposed parallel to the pivot shaft, and the reinforcing member may comprise a second reinforcing surface that reinforces at least a portion of the second surface. In this embodiment, it is possible to reinforce the second reinforcing surface between the first end and the second end with the second reinforcing surface.

The body member may comprise a first connecting portion that is coupled to one end of the pivot shaft on one surface of the clutch cam, and the reinforcing member may comprise a second connecting portion that is coupled to the other end of the pivot shaft on the other surface of the clutch cam. In this embodiment, the clutch return member is disposed such that the reinforcing member and the body member sandwich the clutch cam. The clutch return member is, thereby, less likely to sag even when a force from the first end toward the second end acts on the clutch return member during clutch return. As a result, the clutch cam is less likely to be deformed, and the clutch return member is able to efficiently transmit force to the clutch cam.

The reinforcing member may be insert molded to the body member. In this embodiment, the task of mounting or the task of bonding the reinforcing member to the body member is unnecessary even if the body member is reinforced by the reinforcing member.

The reinforcing member is separate from the body member. In this embodiment, the restriction on the disposition of the reinforcing member is relaxed, and it is simple to dispose the reinforcing member in an effective position.

The reinforcing member may be screwed to the body member. In this embodiment, the reinforcing member can be attached and detached.

The reinforcing member may also be bonded to the body member. In this embodiment, it is easy to attach the reinforcing member.

The biasing member is a twisting toggle spring in which one end is locked to the reel body and the other end is locked to the body member. In this embodiment, dividedly biasing the clutch return member to the engaged position and the separated position is possible with a simple configuration.

The reel body comprises a movement regulating recess that is disposed facing the clutch return member, and the body member comprises a regulating projection, the movement of which is regulated by the movement regulating recess. In this embodiment, moving the clutch return member towards the rotating member is easy when this member is biased by the biasing member.

According to the present invention, it is possible to secure the necessary strength with the metallic reinforcing member, and secure the flexibility and reduce the weight in order to prevent the deformation of the clutch cam with the synthetic resin body member. As a result, reducing the weight while maintaining the strength of the crank member and while preventing the deformation of the clutch cam is possible.

BRIEF DESCRIPTION OF THE DRAWINGS

Referring now to the attached drawings which form a part of this original disclosure.

DETAILED DESCRIPTION OF EMBODIMENTS

Figure 1:
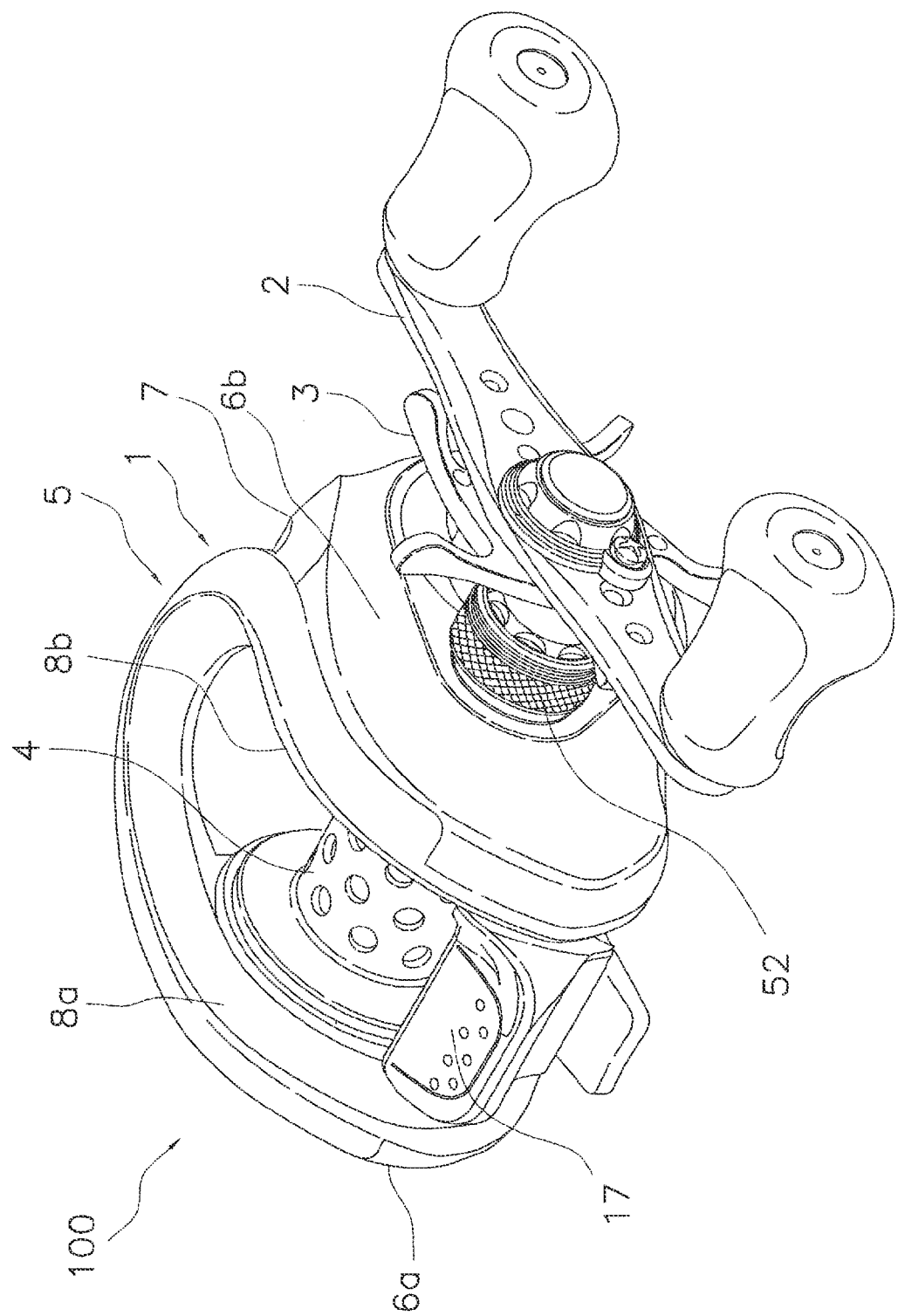
FIG. 1 is a perspective view of a dual-bearing reel employing a first embodiment of the present invention.

FIG. 1 is a perspective view of a dual-bearing reel 100 employing the first embodiment of the present invention. The dual-bearing reel 100 shown in the diagram is, for example, a low-profile bait casting reel. The dual-bearing reel 100 comprises a reel body 1 that can be mounted to a fishing rod, a handle 2 for rotating a spool that is disposed on the side of the reel body 1, a star drag 3 for adjusting the drag that is disposed on the reel body 1 side of the handle 2, and a spool 4 that is rotatably mounted to the reel body 1. A clutch operating member 17 is mounted to the rear of the reel body 1.

Configuration of the Reel Body

The reel body 1 comprises a metallic frame 5 made of, for example, an aluminum alloy or a magnesium alloy; a first side cover 6a and a second side cover 6b made of, for example, an aluminum alloy or a synthetic resin, mounted so as to cover both sides of the frame 5; and a front cover 7 made of, for example, an aluminum alloy or a synthetic resin, mounted to front of the frame 5.

Figure 2:
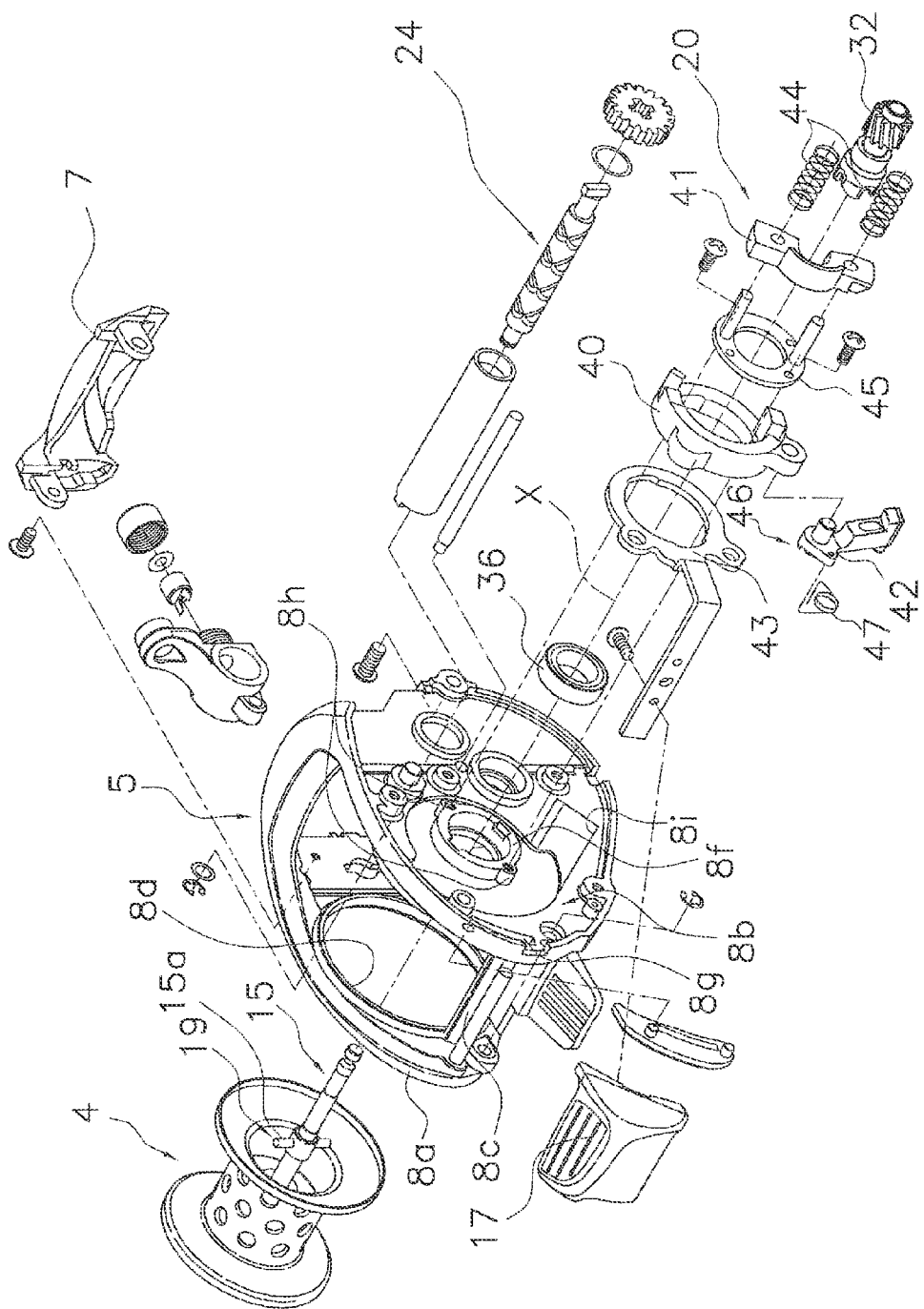
FIG. 2 is an exploded perspective view of the dual-bearing reel.

As shown in FIG. 2, the frame 5 comprises a first side plate 8a and a second side plate 8b that are disposed to face each other with a predetermined gap, as well as a plurality of connecting portions 8c that couple the first side plate 8a and the second side plate 8b.

The first side plate 8a is a generally plate-like member, to which is formed a circular opening 8d for removing the spool 4. A clutch control mechanism 20 and a rotation transmission mechanism 18 discussed below are supported by the second side plate 8b.

As shown in FIG. 2, disposed on the frame 5 are a spool 4 that is rotatably disposed between the first side plate 8a and the second side plate 8b, a level winding mechanism 24 for evenly winding a line to the spool 4, a clutch operating member 17 that moves to where the thumb is placed when conducting thumbing, and a clutch mechanism 19 for coupling and releasing the handle 2 and the spool 4. Additionally, disposed between the frame 5 and the second side cover 6b are a rotation transmission mechanism 18 (refer to FIG. 4) for transmitting the rotational force from the handle 2 to the spool 4 and the level winding mechanism 24; a clutch control mechanism 20 for controlling the clutch mechanism 19 according to an operation of the clutch operating member 17; a drag mechanism (not shown) for braking the spool 4 when casting fishing line; and a casting control mechanism (not shown) for adjusting the resistive force during the rotation of the spool 4. The spool 4 is fixed to a spool shaft 15 that extends through the center thereof.

Configuration of the Rotation Transmission Mechanism and the Clutch Mechanism

Figure 4:
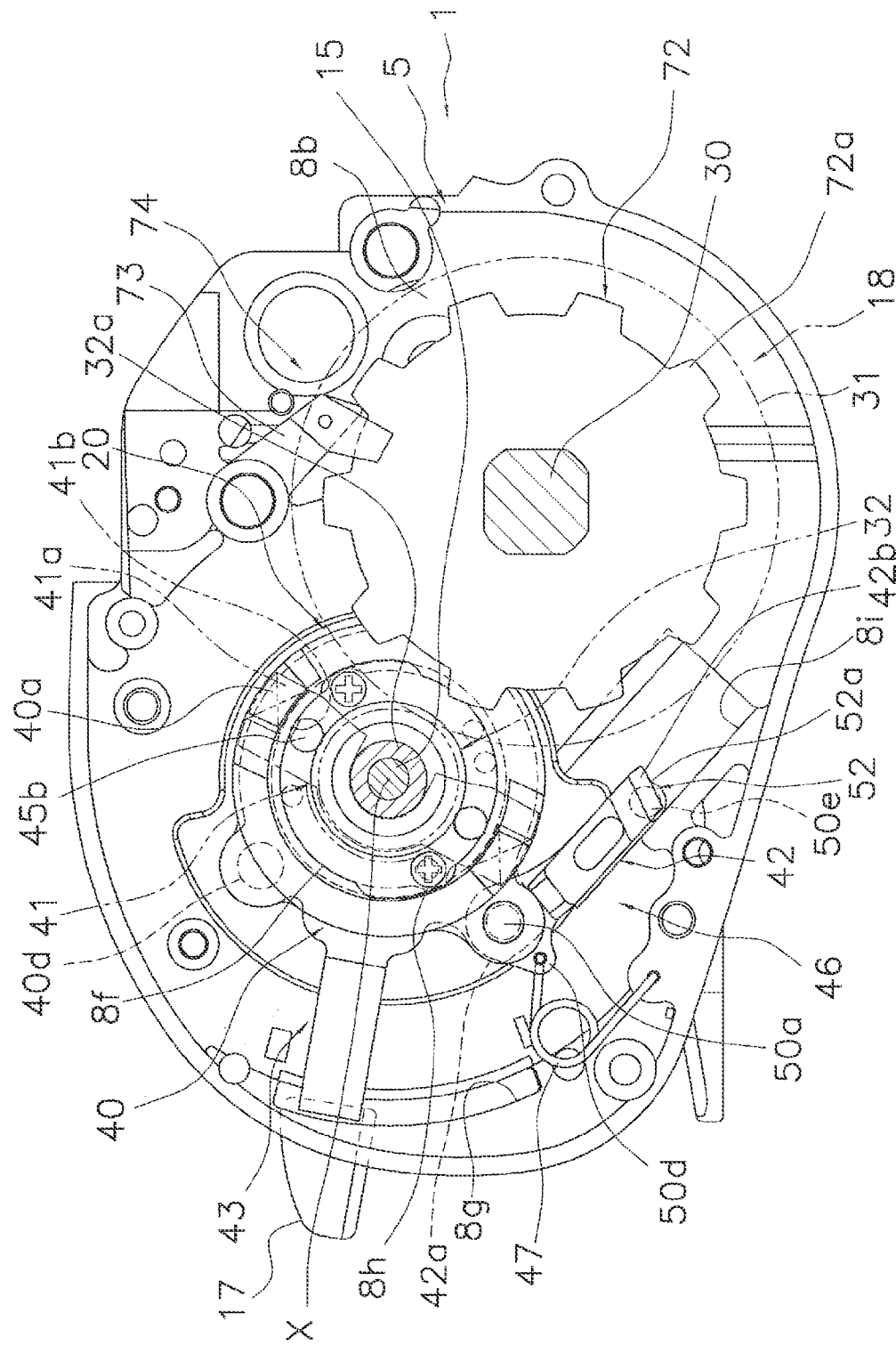
FIG. 4 is a side view showing the clutch control mechanism when the clutch mechanism is in the clutch-on state.

As shown in FIG. 4, provided to the rotation transmission mechanism 18 are a drive shaft 30, a drive gear 31 that is rotatably mounted to the drive shaft 30, and a pinion gear 32 that meshes with the drive gear 31.

The drive shaft 30 is prohibited from rotating in the line delivering (or casting) direction by a roller-type, one-way clutch that is not shown and that is housed in the second side cover 6b. A ratchet wheel 72 (one example of a rotating member) of the clutch return mechanism 46 mentioned below is integrally and rotatably mounted to the drive shaft 30. The ratchet wheel 72 also forms a pawl-type, one-way clutch 74 that meshes with a ratchet pawl 73. A star drag 3 is screwed into the outer peripheral surface of the drive shaft 30. The drive shaft 30 is rotatably supported by the second side cover 6b and the second side plate 8b. The rotation of the handle 2 is transmitted to the drive gear 31, which comprises helical gears, via a drag mechanism.

Figure 3:
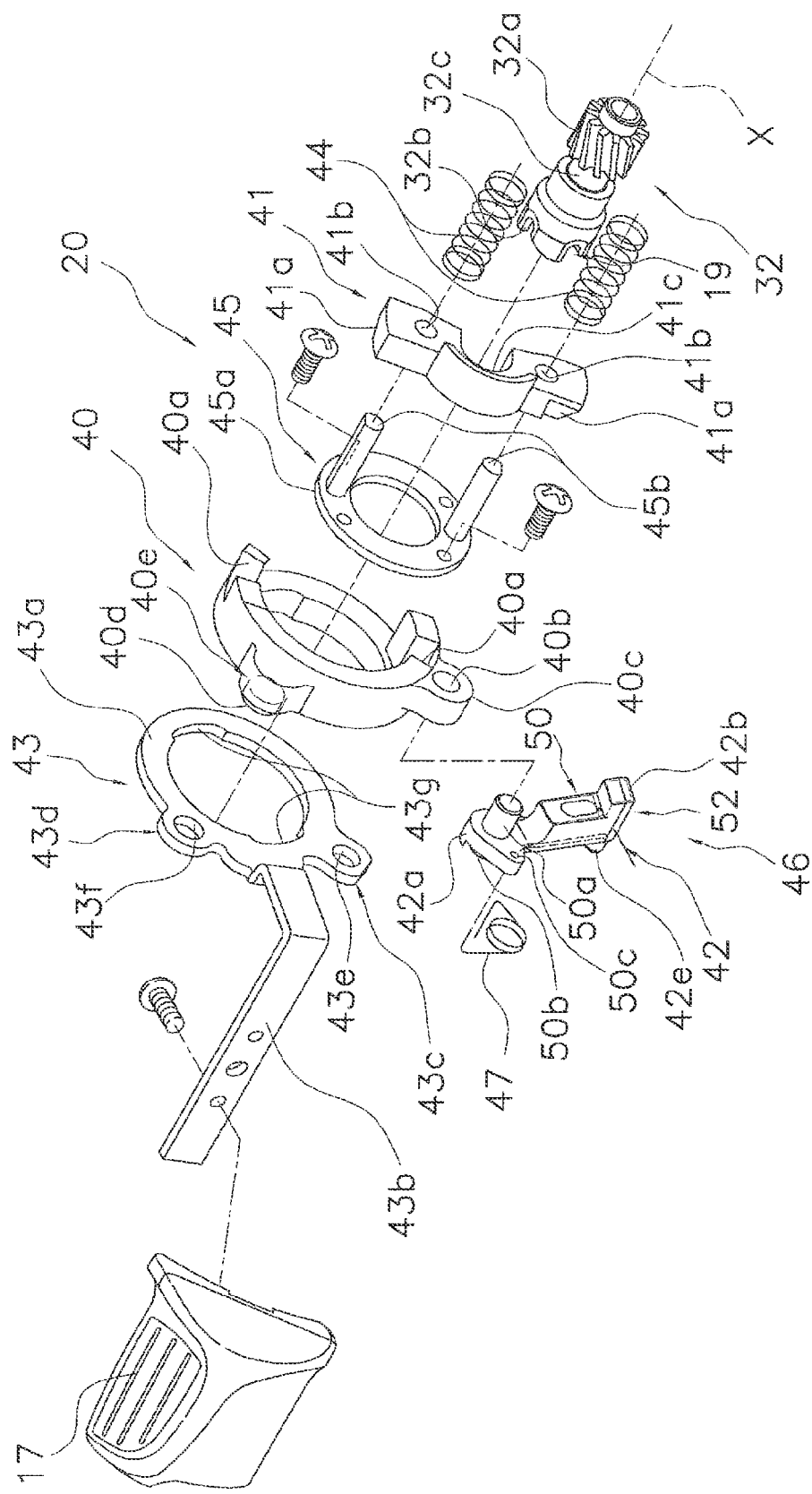
FIG. 3 is an exploded perspective view showing the configuration of a clutch control mechanism thereof.

As shown in FIG. 2 and FIG. 3, the pinion gear 32 is formed from helical gears and is rotatably disposed on the outer peripheral side of the spool shaft 15 to be movable in the axial direction. The pinion gear 32 comprises a helical gear portion 32a that is formed to mesh with the drive gear 31 on the outer peripheral part of one end side, an engagement groove 32b formed on the surface of the other end, and a small-diameter portion 32c formed between the gear portion 32a and the engagement groove 32b. The engagement groove 32b is able to engage with and detach from an engagement pin 15a that is mounted to the spool shaft 15. The outer peripheral surface of the forming portion of the engagement groove 32b is rotatably supported by the second side plate 8b by an axle bearing 36. The axle bearing 36 is mounted to a second boss portion 8f of the second side plate 8b.

A clutch mechanism 19 for transmitting and blocking the rotational force between the handle 2 and the spool 4 is formed from the engagement groove 32b of the pinion gear 32 and the engagement pin 15a of the spool shaft 15. Accordingly, when the pinion gear 32 moves to the axially outward OFF position and the engagement groove 32b and the engagement pin 15a of the spool shaft 15 are detached, the clutch mechanism 19 is put in a clutch-off state, and the rotational force from the drive shaft 30 is blocked and not transmitted to the spool shaft 15. For this reason, the spool 4 is put in a free rotation state. Additionally, when the pinion gear 32 moves to the axially inward ON position and the engagement groove 32b engages the engagement pin 15a, the clutch mechanism 19 is put in a clutch-on state, and the rotation of the handle 2 is transmitted to the spool 4. The drag mechanism applies the brakes to the rotation of the spool 4 in the line casting direction.

Configuration of the Clutch Operating Member

Figure 5:
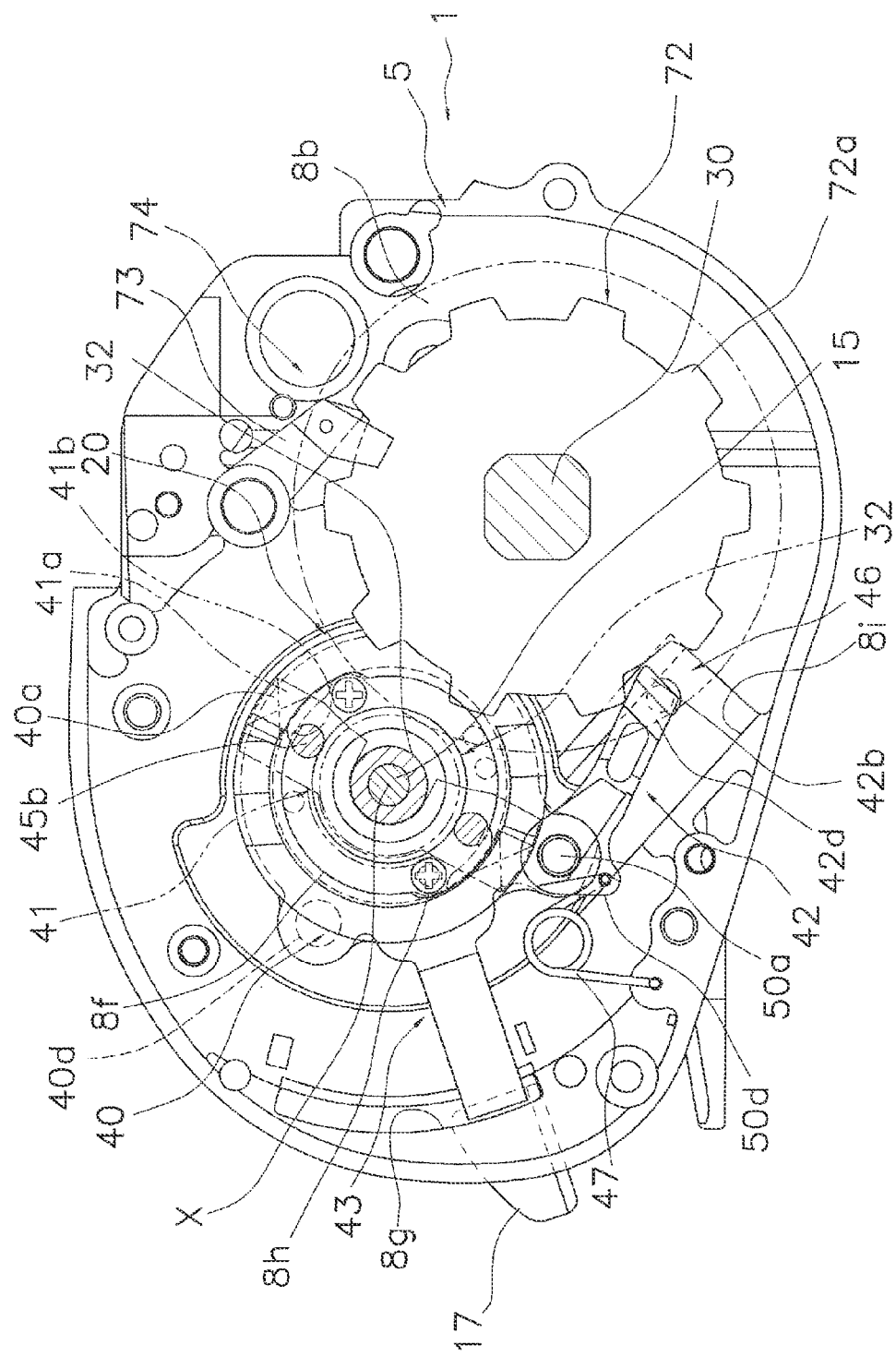
FIG. 5 is a side view showing the clutch control mechanism when the clutch mechanism is in the clutch-off state.

The clutch operating member 17 is movably coupled to the clutch control mechanism 20 between the clutch-on position shown in FIG. 4 and the clutch-off position shown in FIG. 5. The clutch operating member 17 is disposed between the first side plate 8a and the second side plate 8b at the rear of the frame 5. The clutch operating member 17 is also used as a thumb rest when thumbing.

Configuration of the Clutch Control Mechanism

As shown in FIG. 2, the clutch control mechanism 20 comprises a synthetic resin clutch cam 40 that turns around the spool shaft core X by operating the clutch operating member 17, a synthetic resin clutch yoke 41, a metallic coupling member 43, and a clutch return mechanism 46. The clutch control mechanism 20 comprises a coil spring 44 that biases the clutch yoke 41 inward in the spool shaft direction.

Configuration of the Clutch Cam

Figure 6:
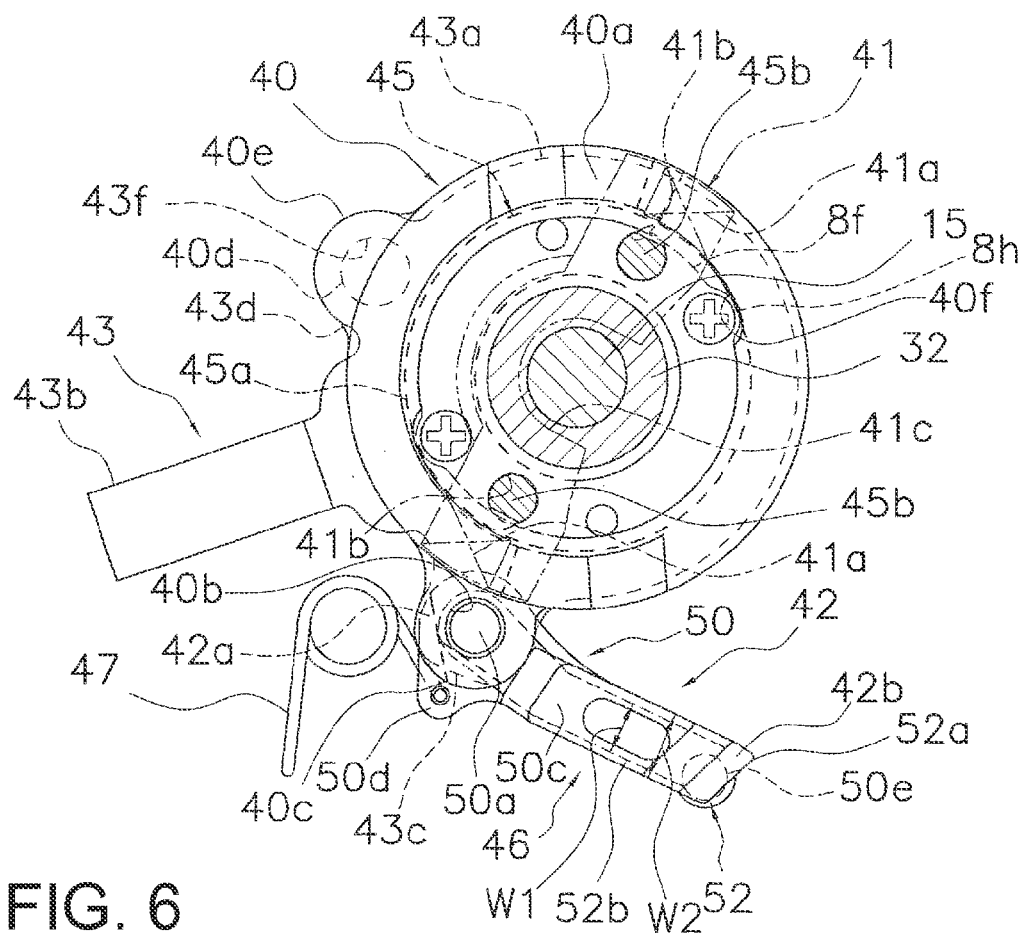
FIG. 6 is a side view showing the main parts of the clutch control mechanism when the clutch mechanism comprising the clutch return member of the first embodiment is in the clutch-off state.
Figure 7:
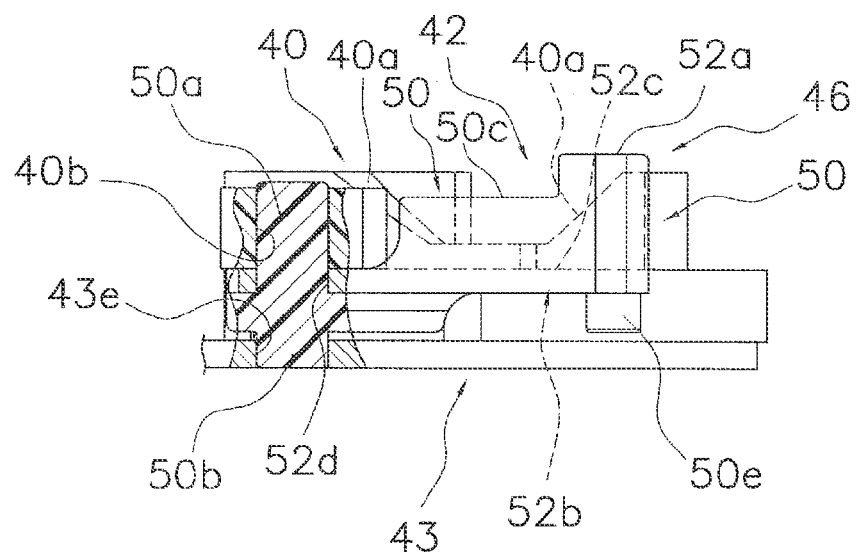
FIG. 7 is a partial sectional side view of FIG. 6.

The clutch cam 40 is a generally cylindrical member that is mounted to the second side plate 8b so as to be freely pivotal about the spool shaft core X, as shown in FIG. 3, FIG. 4, FIG. 5, FIG. 6, and FIG. 7. The clutch cam 40 is freely pivotal between the released position shown in FIG. 5, corresponding to the clutch-off state, and the coupled position shown in FIG. 4, corresponding to the clutch-on state. As shown in FIG. 3 and FIG. 7, the clutch cam 40 comprises a pair of cam surfaces 40a configured from inclined surfaces that press the clutch yoke 41 outwards in the spool shaft direction on the outside surface (the right side surface in FIG. 5). The clutch cam 40 further comprises a coupling hole 40b that freely and pivotally couples a clutch pawl 42 (one example of a clutch return member) mentioned below. The coupling hole 40b is formed in a first connecting portion 40c that protrudes radially outwards from the cam surface 40a. A second connecting portion 40e, to which is integrally formed a coupling protrusion 40d for integrally turning with the coupling member 43, is formed protruding radially outwards on the outer peripheral surface of the clutch cam 40. The second connecting portion 40e is disposed at an interval with the first connecting portion 40c in the circumferential direction. A pair of escape portions 40f (FIG. 6) are recesses formed in a circular arc shape on the diameter on the inner peripheral surface of the clutch cam 40. The escape portions 40f are formed in order to divert a pair of mounting protrusions 8h that are formed protruding radially outwards on the outer peripheral part of the second boss portion 8f. The turning range of the clutch cam 40 is regulated by the escape portions 40f abutting the mounting protrusion 8h.

Configuration of the Clutch Yoke

The clutch yoke 41 engages the clutch cam 40 and moves the pinion gear 32 in the spool shaft direction by the turning of the clutch cam 40, as shown in FIG. 2, FIG. 3, FIG. 4, FIG. 5, and FIG. 6. Two cam receiving parts 41a that engage the cam surface 40a are formed in positions of point symmetry on the inner side surface of the clutch yoke 41. The clutch yoke 41 is pressed outward in the spool shaft direction with the cam surface 40a engaging the cam receiving part 41a. The clutch yoke 41 is guided in the spool shaft direction by a guide member 45 that is fixed to the second boss portion 8f. The guide member 45 comprises a fixed portion 45a that is screwed to the mounting protrusion 8h of the second boss portion 8f and a pair of guide shafts 45b erected in the fixed portion 45a. A pair of guide holes 41b that are guided by the guide shafts 45b is formed in the clutch yoke 41.

The clutch yoke 41 is biased inward in the spool shaft direction (leftward in FIG. 3) by a coil spring 44 that is mounted on the outer periphery of the guide shaft 45b. The coil spring 44 is disposed in a compressed state between the inner side surface of the second side cover 6b and the outer side surface of the clutch yoke 41. Additionally, a semi-circular engagement groove 41c for locking a small-diameter portion 32c of the pinion gear 32 is formed in the center part of the clutch yoke 41. The clutch yoke 41 moves the pinion gear 32 to the on position and the off position in the spool shaft direction with this engagement groove 41c.

Configuration of the Coupling Member

The coupling member 43 turns the clutch cam 40 by operating the clutch operating member 17, as shown in FIG. 2, FIG. 3, FIG. 4, FIG. 5, FIG. 6, and FIG. 7. The coupling member 43 is a plate-like member that made of, for example, a stainless steel alloy and that is disposed between the clutch cam 40 and the outer side surface of the second side plate 8b. The coupling member 43 comprises a mounting portion 43a that is rotatably mounted to the second boss portion 8f, an operating member fixing portion 43b, a first protrusion 43c, and a second protrusion 43d that extends in the radial direction along the second connecting portion 40e.

The mounting portion 43a is a generally washer-shaped portion that is disposed between the clutch cam 40 and the outer side surface of the second side plate 8b in the periphery of the second boss portion 8f. Escape portions 43g for diverting the mounting protrusion 8h in the same way as the escape portions 40f are recesses formed in a circular arc shape on the inner peripheral surface of the mounting portion 43a.

The operating member fixing portion 43b extends generally rearward from the mounting portion 43a. The operating member fixing portion 43b is bent so as to be disposed substantially parallel with the spool shaft core X after extending in the radial direction from the mounting portion 43a. The clutch operating member 17 is fixed to this bent portion with a screw. As shown in FIG. 2, the operating member fixing portion 43b extends through a slit 8g that is formed in a circular arc shape at the rear of the second side plate 8b and protrudes toward the inner side surface of the first side plate 8a.

As shown in FIG. 3, the first protrusion 43c extends in the radial direction along the first connecting portion 40c of the clutch cam 40. The first protrusion 43c is formed so as to sandwich the proximal end of the clutch pawl 42 with the clutch cam 40. A pawl coupling hole 43e that is coupled to the clutch pawl 42 is formed in the first protrusion 43c. The second protrusion 43d extends in the radial direction along a second connecting portion 40e of the clutch cam 40. A cam coupling hole 43f that is coupled to the coupling protrusion 40d of the clutch cam 40 is formed in the second protrusion 43d.

Configuration of the Clutch Return Mechanism

The clutch return mechanism 46 is for returning the clutch mechanism 19 in a clutch-off state to a clutch-on state in conjunction with the rotation of the handle 2 in the line winding direction. The clutch return mechanism 46 comprises a ratchet wheel 72 as a rotating member that is integrally and rotatably mounted to the drive shaft 30, a ratchet pawl 42 that is coupled to the clutch cam 40, and a toggle spring member 47 (one example of a biasing member).

Configuration of the Ratchet Wheel

The ratchet wheel 72 also functions as a one-way clutch 74 that prohibits the rotation of the drive shaft 30 in the line casting direction, as described above. The ratchet wheel 72 is integrally and rotatably mounted to the drive shaft 30, and a plurality of teeth 72a are formed at intervals in the rotational direction of the outer peripheral part thereof, as shown in FIG. 4 and FIG. 5.

Configuration of the Clutch Pawl

As shown in FIG. 2, FIG. 3, and FIG. 6, the clutch pawl 42 comprises a first end 42a (the upper end in FIG. 3) and a second end 42b that extends from the first end 42a toward the ratchet wheel 72. The first end 42a of the clutch pawl 42 is pivotally coupled to the clutch cam 40 between the engaged position shown in FIG. 5 and the separated position shown in FIG. 4. The clutch pawl 42 is pivotally coupled to the clutch cam 40 by a pivot shaft 50a that is disposed to be parallel to the spool shaft 15. The engaged position is a position in which the second end 42b engages with the teeth 72a of the ratchet wheel 72. The separated position is a position in which the second end 42b separates from the ratchet wheel 72.

The ratchet pawl 42 comprises a synthetic resin body member 50 that is pivotally mounted to the clutch cam 40, as well as a metallic reinforcing member 52 that is integrally able to pivot with the body member 50 and reinforces the body member 50. The body member 50 is, for example, a member made from a synthetic resin, such as polyamide resin, polyacetal resin, etc. The reinforcing member 52 is a metallic member that is highly rigid and resistant to corrosion, such as, for example, a stainless steel alloy.

As shown in FIG. 6 and FIG. 7, the body member 50 extends from the first end 42a to the second end 42b of the clutch pawl 42. The body member 50 comprises a pivot shaft 50a that is fitted to the coupling hole 40b of the clutch cam 40 and a coupling protrusion 50b that is fitted to the pawl coupling hole 43e of the coupling member 43 at the proximal end (the first end 42a of the clutch pawl 42). The pivot shaft 50a protrudes in a cylindrical shape toward the clutch cam 40. The coupling protrusion 50b protrudes in a cylindrical shape toward the coupling member 43 and is coaxially disposed with the pivot shaft 50a. Therefore, as shown in FIG. 7, the clutch pawl 42 is clamped between the clutch cam 40 and the coupling member 43 and is pivotally coupled to the clutch cam 40 and the coupling member 43. The body member 50 further comprises a first surface 50c that intersects with the pivot shaft 50a.

As shown in FIG. 3 and FIG. 6, a spring locking portion 50d, to which one end of the toggle spring member 47 is locked, is formed at the proximal end of the body member 50. The clutch pawl 42 moves in conjunction with the turning of the clutch cam 40 between a separated position in which the clutch pawl is separated from the ratchet wheel 72, as shown in FIG. 4, and an engaged position in which the clutch pawl is engaged with the ratchet wheel 72, as shown in FIG. 5. A regulating protrusion 50e, which protrudes towards a movement regulating recess 8i (refer to FIG. 4 and FIG. 5) that is recessed on the outer side surface of the second side plate 8d, is integrally disposed on the distal end side (the second end 42b side of the clutch pawl 42) of the body member 50. The regulating protrusion 50e is formed protruding outward in the spool shaft direction. The regulating protrusion 50e is disposed so as to come in contact with the wall of the movement regulating recess 8i and to dispose the distal end in the vicinity of the ratchet wheel 72. The clutch pawl 42 is positioned to the separated position and the engaged position by being guided by the movement regulating recess 8i and by being dividedly biased by the toggle spring member 47. The toggle spring member 47 divides and biases the clutch cam 40 and the coupling member 43 to the coupled position and the released position via the clutch pawl 42.

The reinforcing member 52 is integrally formed on the body member 50 by insert molding. The reinforcing member 52 is formed by bending the distal end of a metal plate made of a stainless steel alloy. The reinforcing member 52 comprises an engagement surface 52a that is disposed on the bent distal end (the second end 42b of the clutch pawl 42) and a mounting portion 52b that extends from the engagement surface 52a to the proximal end side (the first end 42a of the clutch pawl 42). The engagement surface 52a can be engaged with the teeth 72a of the ratchet wheel 72 that rotates in the line winding direction. When the clutch pawl 42 is in the engaged position and the ratchet wheel 72 rotates in the line winding direction, the engagement surface 52a is pressed by the teeth 72a of the ratchet wheel 72. As shown in FIG. 6, the mounting portion 52b comprises a first reinforcing surface 52c that reinforces at least a part of the first surface 50c of the body member 50. The width W1 of the first reinforcing surface 52c is smaller than the width W2 of the first surface 50c of the body member 50. For this reason, in this embodiment, the reinforcing member 52 is embedded in the body member 50 and reinforces a part of the first surface 50c of the body member 50. As shown in FIG. 7, a through-hole 52d through which a pivot shaft 50a can pass is formed on the proximal end side of the mounting portion 52b.

Configuration of the Toggle Spring Member

The toggle spring member 47 is, for example, a twisting coil spring, one end of which is locked to the spring locking portion 50d of the body member 50, as described above, and the other end of which is locked to the outer side surface of the second side plate 8b. The toggle spring member 47 divides and biases the clutch pawl 42 to the separated position and the engaged position. The clutch cam 40 and the coupling member 43 are thereby dividedly biased to the coupled position and the released position across a dead center at which the biasing force is minimal. At the same time, the clutch operating member 17 is dividedly biased to the clutch-on position and the clutch-off position.

In such a configuration, in a normal state, the pinion gear 32 is positioned in the axially inward ON position, the engagement groove 32b and the engagement pin 15a of the spool shaft 15 are engaged, and the clutch mechanism 19 is in a clutch-on state. At this time, the clutch pawl 42 is disposed to be in the separated position. On the other hand, when the clutch operating member 17 is put in the clutch-off position and the pinion gear 32 is pressed and moved axially outward by the clutch yoke 41, the engagement groove 32b and the engagement pin 15a are disengaged, and the clutch mechanism 19 is in a clutch-off state. Consequently, the clutch pawl 42 moves from the separated position to the engaged position.

In this state, if the handle 2 rotates in the line winding direction, the ratchet wheel 72 rotates in the line winding direction. When the ratchet wheel 72 rotates in the line winding direction, the teeth 72a will press the engagement surface 52a of the clutch pawl 42 toward the separated position. When the clutch pawl 42 exceeds the dead center of the toggle spring member 47, the clutch pawl 42 is biased toward the separated position. With the movement of the clutch pawl 42 to the separated position, the clutch cam 40 and the coupling member 43, which are coupled to the clutch pawl 42, turn from the released position to the coupled position. Consequently, the clutch mechanism 19 returns from the clutch-off state to the clutch-on state. At this time, the clutch operating member 17 also returns from the clutch-off position to the clutch-on position. In this clutch return operation with the handle 2, the clutch pawl 42 is coupled to the coupling member 43 in addition to the clutch cam 40; as a result, executing a clutch return operation without deforming the clutch cam 40 is possible. For this reason, the clutch return operation is less likely to be difficult.

Since the clutch cam 40 and the coupling member 43 are coupled to the clutch pawl 42, shearing force from the coupling member 43 is unlikely to be generated and transferred to the clutch cam 40; as a result, a large shearing force will not be applied to the clutch cam 40.

In the clutch pawl 42, the synthetic resin body member 50 is reinforced by the reinforcing member 52. For this reason, it is possible to secure the necessary strength with the metallic reinforcing member 52, and it is possible to secure the flexibility and reduce the weight in order to prevent the deformation of the clutch cam 40 with the synthetic resin body member 50. As a result, it is possible to reduce the weight while maintaining the strength of the clutch pawl 42, while preventing the deformation of the clutch cam 40.

Operation of the Dual-Bearing Reel

As shown in FIG. 4, in a normal state, the clutch operating member 17 is disposed in the clutch-on position, and the clutch yoke 41 is pressed inwards in the spool shaft direction by the coil spring 44. The pinion gear 32 is, thereby, disposed to be in the ON position. In this state, the engagement groove 32b of the pinion gear 32 and the engagement pin 15a of the spool shaft 15 are engaged, and the clutch mechanism 19 is in the clutch-on state. In this clutch-on state, the rotational force from the handle 2 is transmitted to the spool shaft 15 and the spool 4 via the drive shaft 30, the drive gear 31 and the pinion gear 32.

The clutch operating member 17 is pressed downward when lowering the tackle. Specifically, the clutch operating member 17 is pressed downward with the ball of the finger that performs thumbing by contacting the distal end to the spool 4. With this pressing operation, the clutch operating member 17 is turned downward around the spool shaft core X and moves from the clutch-on position to the clutch-off position.

Since the clutch operating member 17 and the coupling member 43 are coupled, by turning the clutch operating member 17 downward, the coupling member 43 turns about the spool shaft core X counterclockwise in FIG. 4. The coupling member 43 and the clutch cam 40 are coupled via the coupling protrusion 40d, the cam coupling hole 43f, and the clutch pawl 42. For this reason, with this coupling structure, when the coupling member 43 turns counterclockwise, the clutch cam 40 also turns counterclockwise around the spool shaft core X from the coupled position to the released position, which is against the biasing force of the toggle spring member 47.

When the clutch cam 40 turns counterclockwise, since the cam receiving part 41a of the clutch yoke 41 abuts the cam surface 40a of the clutch cam 40, the clutch yoke 41 moves outward in the spool shaft direction (rightward in FIG. 2) along the cam surface 40a. Since the clutch yoke 41 is engaged with the small-diameter portion 32c of the pinion gear 32, the pinion gear 32 moves to the OFF position due to the clutch yoke 41 being moved axially outward. In this state, the engagement groove 32b of the pinion gear 32 and the engagement pin 15a of the spool shaft 15 are disengaged, generating the clutch-off state. In the clutch-off state, the rotation from the drive shaft 30 is not transmitted to the spool 4. As a result, the spool 4 is put in a free rotation state, and the fishing line, which is wound to the spool 4 by the weight of the tackle, is unreeled.

The appearance of the clutch-off state is shown in FIG. 5. When the coupling member 43 and the clutch cam 40 rotate due to the clutch operating member 17 being moved to the clutch-off position below, the regulating protrusion 50e that is provided to the second end 42b of the clutch pawl 42 is guided to the movement regulating recess 8i; when exceeding the dead center of the toggle spring member 47, the regulating protrusion is biased to the engaged position side and moves to the ratchet wheel 72 side.

When starting to drop the tackle, a finger moves slightly diagonally forward to put the tip in contact with the spool 4 in order to perform thumbing.

Next, in the case of quickly switching from the clutch-off state back to the clutch-on state after disposing the tackle in the ledge position, if the drive shaft 30 is rotated clockwise (the line winding direction) with the handle 2 in the clutch-off position, as shown in FIG. 5, the engagement surface 52*a* of the clutch pawl 42 will be pressed by the teeth 72*a* of the ratchet wheel 72. When the engagement surface 52*a* is pressed and the clutch pawl 42 exceeds the dead center of the toggle spring member 47, the clutch pawl 42 will return to the separated position by the biasing force of the toggle spring member 47. In conjunction with the above, the clutch cam 40 will return to the coupled position, and the clutch mechanism 19 will be put into a clutch-on state.

When returning the clutch mechanism 19 to the clutch-on state with the rotation of the handle 2 in the line winding direction, the clutch pawl 42 is coupled to the coupling member 43 in addition to the clutch cam 40; as a result, executing a clutch return operation without deforming the clutch cam 40 is possible. For this reason, the clutch return operation is less likely to become difficult.

Second Embodiment

Figure 8:
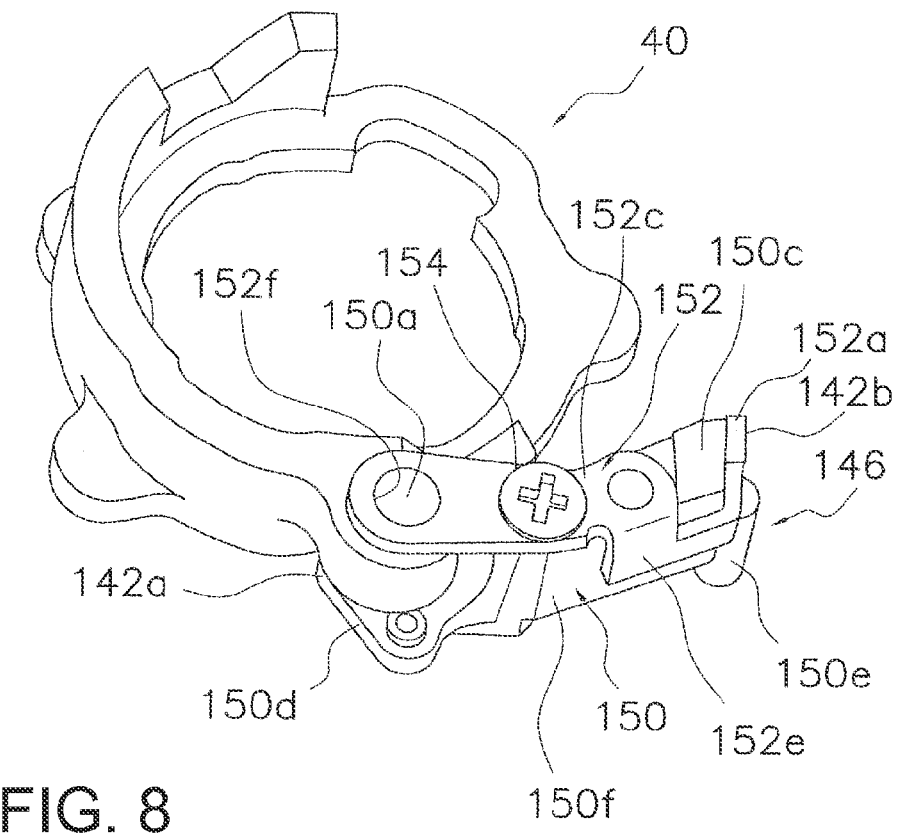
FIG. 8 is a perspective view showing a clutch return member of a second embodiment.
Figure 9:
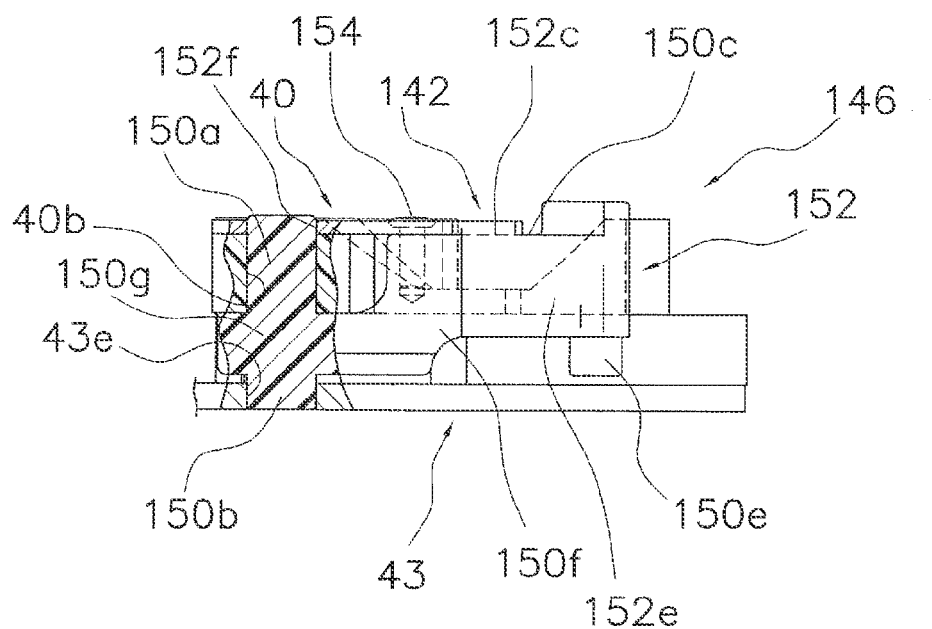
FIG. 9 is a diagram of the clutch return member of the second embodiment corresponding to FIG. 7.

In the first embodiment, the reinforcing member 52 of the clutch pawl 42 was insert molded and integrally formed with the body member 50; however, in a clutch return mechanism 146 of the second embodiment, as shown in FIGS. 8 and 9, a reinforcing member 152 of a clutch pawl 142 is separate from a body member 150. In the second embodiment, the members corresponding to those described in the first embodiment are shown with reference symbols having added "100" added to the reference symbols used in the first embodiment.

The body member 150 comprises a pivot shaft 150*a*, a coupling protrusion 150*b*, a first surface 150*c*, a spring locking portion 150*d*, and a regulating protrusion 150*e* configured in the same way as in the first embodiment. The body member 150 further comprises a second surface 150*f* that is disposed to be parallel to the pivot shaft 150*a*. The body member 150 comprises a first connecting portion 150*g* that is integrally coupled to one end of the pivot shaft 150*a* on one surface (the surface opposing the second side plate 8*b* on the lower side of FIG. 9) of the clutch cam 40.

The reinforcing member 152 is formed by bending a metal plate made of a stainless steel alloy. The reinforcing member 152 is screwed and fixed to the body member 150 by a screw member 154 that is screwed into the body member 150. The reinforcing member 152 can also be bonded to the body member 150. The reinforcing member 152 comprises an engagement surface 152*a* disposed on the distal end, a first reinforcing surface 152*c* that reinforces at least a part of the first surface 150*c*, and a second reinforcing surface 152*e* that reinforces at least a part of the second surface 150*f*. The second reinforcing surface 152*e* is formed to be bent away from the engagement surface 152*a*. The first reinforcing surface 152*c* is formed via a bend that is substantially 90 degrees from the second reinforcing surface 152*e*. The first reinforcing surface 152*c* extends to the first end 142*a* sandwiching the clutch cam 40 with the body member 150. A screw member 154 is mounted to the first reinforcing surface 152*c*. Additionally, the reinforcing member 152 comprises a second connecting portion 152*f* that is coupled to the other end of the pivot shaft 150*a* on the other surface (the surface that does not oppose the second side plate 8*b* on the upper side of FIG. 9) of the clutch cam 40. The second connecting portion 152*f* is a through-hole that is formed on the first end 142*a* side of the first reinforcing surface 152*c* to fit the pivot shaft 150*a*.

In a clutch return mechanism 146 according to the second embodiment formed in this way, the clutch pawl 142 is disposed sandwiching the clutch cam 40. For this reason, when returning the clutch mechanism 19 to the clutch-on state by rotating the handle 2 in the line winding direction, since the clutch pawl 142 is coupled to the coupling member 43 in addition to the clutch cam 40 and is disposed sandwiching the clutch cam 40, executing a clutch return operation without further deforming the clutch cam 40 is possible. For this reason, the clutch return operation is less likely to be difficult.

Other Embodiments

One embodiment of the present invention was described above, but the present invention is not limited to the above-described embodiment; various modifications can be made without departing from the scope of the invention.

In the embodiments described above, an example was given of a clutch operating member applied to a dual-bearing reel with a non-circular reel body; however, the clutch control mechanism of the present invention can be applied to a dual-bearing reel with a circular reel body.

The embodiments described above have a clutch operating member 17 only at the rear of the reel body; however, the present invention may also be applied to a clutch control mechanism having a separate clutch operating member on top, etc. of the reel body.

In the first and the second embodiments, a coupling protrusion 50*b* (or 150*b*) is provided to the clutch pawl 42 (or 142), but a coupling protrusion does not have to be provided. In the first and the second embodiments, the reinforcing member 52 (or 152) reinforces a part of the body member 50 (or 150), but the reinforcing member can also reinforce the whole member.

Characteristics

The embodiment described above can be expressed as follows.

A clutch return mechanism 46 of a dual-bearing reel 100 is a mechanism for returning a clutch cam 40, which is rotatably mounted to a reel body 1 that is between a coupled position, in which a handle 2 provided to the reel body 1 of the dual-bearing reel 100 and a spool 4 that rotates with the handle 2 are in a coupled state, and a released position, in which the handle and the spool are in a released state, from the released position to the coupled position. The clutch return mechanism 46 comprises a ratchet wheel 72 that is integrally rotatable with the handle 2, a clutch pawl 42, and a toggle spring member 47. The clutch pawl 42 comprises a first end 42*a* and a second end 42*b* that extends from the first end 42*a* toward a rotating member; the first end 42*a* is pivotally coupled to the clutch cam 40 by a pivot shaft 50*a* that is disposed to be parallel to a spool shaft 15 of the spool 4 between an engaged position, in which the second end 42*b* engages with the ratchet wheel 72, and a separated position, in which the second end 42*b* is separated from the ratchet wheel 72. The clutch pawl 42 comprises a synthetic resin body member 50 and a metallic reinforcing member 52. The synthetic resin body member 50 is pivotally mounted to the clutch cam 40. The metallic reinforcing member 52 is integrally able to pivot with the body member 50 and reinforces the body member 50. The toggle spring member 47 divides and biases the clutch pawl 42 to the engaged position and the separated position.

In this clutch return mechanism 46, the clutch pawl 42, which returns the clutch cam 40 from a released position to a coupled position, is configured from a synthetic resin body member 50 and a metallic reinforcing member 52, which reinforces the body member 50. Accordingly, it is possible to secure the necessary strength with the metallic reinforcing member 52, and it is possible to secure the flexibility and reduce the weight in order to prevent the deformation of the clutch cam 40 with the synthetic resin body member 50. As a result, it is possible to reduce the weight while maintaining the strength of the clutch pawl 42, while preventing the deformation of the clutch cam 40.

(B) The reinforcing member 52 may comprise an engagement surface 52*a* that is disposed to be at least a portion of the second end 42*b* and that can engage with the ratchet wheel 72 at the engaged position. In this embodiment, since the engagement surface 52*a* of the metallic reinforcing member 52 engages the ratchet wheel 72 at the engaged position, the engagement surface 52*a* is less likely to be deformed, and the force of the ratchet wheel will be reliably transmitted to the clutch pawl 42 without escaping.

(C) The body member 50 may comprise a first surface 50*c* that is disposed intersecting a pivot shaft 50*a*, and the reinforcing member 52 may comprise a first reinforcing surface 52*c* that reinforces at least a portion of the first surface 50*c*. In this embodiment, it is possible to reinforce the first surface 50*c* between the first end 42*a* and the second end 42*b* with the first reinforcing surface 52*c*.

(D) A body member 150 may comprise a second surface 150*f* that is disposed to be parallel to a pivot shaft 150*a*, and the reinforcing member 152 may comprise a first reinforcing surface 152*e* that reinforces at least a portion of the second surface 150*f*. In this embodiment, it is possible to reinforce the second surface 150*f* between a first end 142*a* and a second end 142*b* with the second reinforcing surface 152*e*.

(E) The body member 150 may comprise a first connecting portion 150*g* that is coupled to one end of the pivot shaft 150*a* on one surface of the clutch cam 40, and the reinforcing member 152 may comprise a second connecting portion 152*f* that is coupled to the other end of the pivot shaft 150*a* on the other surface of the clutch cam 40. In this embodiment, the clutch pawl 142 is disposed with the reinforcing member 152 and the body member 150 sandwiching the clutch cam 40. The clutch pawl 142 is thereby less likely to sag even when a force from the first end 142*a* towards the second end 142*b* acts on the clutch pawl 142 during clutch return. The clutch cam 40 is thereby less likely to be deformed, and the clutch pawl 42 is able to efficiently transmit force to the clutch cam 40.

(F) The reinforcing member 52 may be insert molded to the body member 50. In this embodiment, the task of mounting or the task of bonding the reinforcing member 52 to the body member 50 is unnecessary even if the body member 50 is reinforced by the reinforcing member 52.

(G) The reinforcing member 152 is separate from the body member 150. In this embodiment, restriction on the disposition of the reinforcing member 152 is relaxed, and it is easy to dispose the reinforcing member 152 in an effective position.

(H) The reinforcing member 152 may be screwed to the body member 150. In this embodiment, the reinforcing member can be attached and detached.

The reinforcing member 152 may also be bonded to the body member 50. In this embodiment, attaching the reinforcing member is easy.

(J) The toggle spring member 47 is a twisting coil spring in which one end is locked to the reel body 1, and the other end is locked to the body member 50. In this embodiment, dividedly biasing the clutch pawl 42 to the engaged position and the separated position is possible with a simple configuration.

(K) The reel body 1 comprises a movement regulating recess 8*i* that is disposed facing the clutch pawl 42, and the body member comprises a regulating projection 50*e*, the movement of which is regulated by the movement regulating recess 8*i*. In this case, moving the clutch pawl 42 towards the ratchet wheel 72 when biased by the toggle spring member 47 is easy.

What is claimed is:

1. A clutch return mechanism of a dual-bearing reel for returning a clutch cam from a released position to a coupled position, the clutch cam being rotatably mounted to a reel body between the coupled position and the released position, the clutch return mechanism comprising:
    a rotating member integrally rotatable with a handle;
    a clutch return member including a first end and a second end extending from the first end toward the rotating member, the first end being pivotally coupled to the clutch cam by a pivot shaft that is disposed so as to be parallel to a rotating shaft of a spool between an engaged position, in which the second end engages the rotating member, and a separated position, in which the second end is separated from the rotating member; and
    a biasing member configured to divide and bias the clutch return member to the engaged position and the separated position,
    the clutch return member comprising
    a synthetic resin body member pivotally mounted to the clutch cam, the body member including a first connecting portion coupled to one end of the pivot shaft on one surface of the clutch cam, and
    a metallic reinforcing member configured to integrally pivot with the body member and to reinforce the body member, the reinforcing member including a second connecting portion coupled to the other end of the pivot shaft on the other surface of the clutch cam.

2. The clutch return mechanism of the dual-bearing reel recited in claim 1, wherein
    the reinforcing member includes an engagement surface disposed to at least a portion of the second end and engaging the rotating member at the engaged position.

3. The clutch return mechanism of the dual-bearing reel recited in claim 1, wherein
    the body member includes a first surface disposed so as to intersect the pivot shaft, and
    the reinforcing member includes a first reinforcing surface reinforcing at least a portion of the first surface.

4. The clutch return mechanism of the dual-bearing reel recited in claim 1, wherein
    the body member includes a second surface disposed so as to be parallel with the pivot shaft, and
    the reinforcing member includes a second reinforcing surface reinforcing at least a portion of the second surface.

5. The clutch return mechanism of the dual-bearing reel recited in claim 1, wherein
    the reinforcing member is insert molded to the body member.

6. The clutch return mechanism of the dual-bearing reel recited in claim 1, wherein
    the reinforcing member is separate from the body member.

7. The clutch return mechanism of the dual-bearing reel recited in claim 6, wherein
    the reinforcing member is screwed to the body member.

8. The clutch return mechanism of the dual-bearing reel recited in claim 6, wherein
    the reinforcing member is bonded to the body member.

9. The clutch return mechanism of the dual-bearing reel recited in claim 1, wherein the biasing member is a twisting coil spring, one end of the twisted coil spring being locked to the reel body and the other end of the twisted coil spring being locked to the body member.

10. The clutch return mechanism of a dual-bearing reel recited in claim 1, wherein the reel body includes a movement regulating recess disposed facing a crank member, and the body member comprises a regulating protrusion, and the movement regulating recess being configured to regulate the movement of the regulating protrusion.

\* \* \* \* \*